United States Patent
Kumkar et al.

(10) Patent No.: US 7,428,257 B2
(45) Date of Patent: Sep. 23, 2008

(54) APPARATUS FOR OPTICAL PUMPING OF A LASER-ACTIVE SOLID BODY

(75) Inventors: Malte Kumkar, Schramberg (DE); Shalei Dong, Chur (CH); Klaus Wallmeroth, Zimmern (DE); Andreas Oehler, Zizers (CH); Markus Nate, deceased, late of Recklinghausen (DE); by Karla Nate, legal representative, Recklinghausen (DE); by Wolfgang Nate, legal representative, Recklinghausen (DE)

(73) Assignees: Trumpf Laser GmbH + Co. KG, Schramberg (DE); Trumpf Laser Marketing Systems AG, Gruesch (CH)

( * ) Notice: Subject to any disclaimer, the term of this patent is extended or adjusted under 35 U.S.C. 154(b) by 127 days.

(21) Appl. No.: 10/765,051

(22) Filed: Jan. 28, 2004

(65) Prior Publication Data

US 2005/0031006 A1  Feb. 10, 2005

Related U.S. Application Data

(63) Continuation of application No. PCT/EP02/08409, filed on Jul. 27, 2002.

(30) Foreign Application Priority Data

Jul. 28, 2001  (DE) ................................ 101 37 069

(51) Int. Cl.
*H01S 3/091* (2006.01)
(52) U.S. Cl. ............................. 372/71; 372/99; 372/72; 372/35

(58) Field of Classification Search .................... 372/71, 372/72, 35, 99
See application file for complete search history.

(56) References Cited

U.S. PATENT DOCUMENTS 4,829,529 A   5/1989  Kafka (Continued)

FOREIGN PATENT DOCUMENTS

DE        28 44 129        4/1980

(Continued)

OTHER PUBLICATIONS

Translated office action from corresponding Japanese application, issued Jul. 11, 2007, 8 pages.

*Primary Examiner*—Minsun Harvey
*Assistant Examiner*—Tod T Van Roy
(74) *Attorney, Agent, or Firm*—Fish & Richardson P.C.

(57) ABSTRACT

An apparatus for optically pumping a laser-active solid body with pumping light coupled into the solid body through an end surface of the solid body is disclosed. The apparatus includes a laser-active solid body including an end surface though which pumping light is coupled into the solid body and a lateral surface through which pumping light exits the solid body, a reflector surrounding the laser-active solid body at a distance from the lateral surface of the solid body for reflecting light that exists the solid body back towards the solid body, and a surface for diffusing light that is coupled into the solid body through the end surface of the solid body and that exits the solid body through the lateral surface. The surface is selected from the group consisting of the lateral surface and a surface of the reflector.

20 Claims, 5 Drawing Sheets

U.S. PATENT DOCUMENTS

| | | | |
|---|---|---|---|
| 5,048,044 A * | 9/1991 | Ireland | 372/66 |
| 5,359,616 A | 10/1994 | Yasui et al. | |
| 5,373,527 A * | 12/1994 | Taniu et al. | 372/71 |
| 5,418,809 A | 5/1995 | August, Jr. et al. | |
| H1673 H * | 8/1997 | Hanson | 372/35 |
| 6,014,391 A * | 1/2000 | Byren | 372/34 |
| 6,094,297 A | 7/2000 | Injeyan et al. | |
| 2002/0118718 A1 * | 8/2002 | Honea et al. | 372/71 |

FOREIGN PATENT DOCUMENTS

| | | |
|---|---|---|
| DE | 43 31 389 | 3/1994 |
| DE | 296 21 859 | 6/1997 |
| DE | 197 23 267 | 12/1998 |
| FR | 2 356 296 | 1/1978 |
| JP | 61272985 | 12/1986 |
| JP | 2000156534 | 6/2000 |
| WO | WO 93/23899 | 11/1993 |

* cited by examiner

US 7,428,257 B2

APPARATUS FOR OPTICAL PUMPING OF A LASER-ACTIVE SOLID BODY

CLAIM OF PRIORITY

This application is a continuation of and claims priority under 35 USC §120 to PCT Application No. PCT/EP 02/08409, filed on Jul. 27, 2002, which claims priority from German Application No. DE 101 37 069.5, filed on Jul. 28, 2001, the entire contents of the prior applications are hereby incorporated by reference.

TECHNICAL FIELD

The invention relates to a device for optically pumping a rod- or slab-shaped, laser-active, solid body with pumping light that is coupled into the solid body at a front side of the solid body and is distributed by reflection.

BACKGROUND

Referring to FIG. 5, in a known optical pumping device 50, focused pumping light 51 is coupled into a rod-shaped Nd:YAG laser crystal 52 at the front side of the crystal 52. The coupled pumping light 54 is totally reflected at the inner side of the polished lateral surface 53 of the laser crystal 52, and is thereby guided within the laser crystal 52 until it is largely absorbed, such that the crystal is optically pumped over its entire length, but the crystal volume is not completely utilized.

However, the multiple total reflection produces local points of increased pumping power density in the laser crystal, which produce a strong thermal disturbance in these areas of the laser crystal, which, in turn, results in strong detuning of the optical resonator and limits the usable pumping power. Moreover, the polished lateral surface can generate so-called amplified stimulated emission ("ASE") and parasitic modes that have a strong negative influence on the laser efficiency and laser beam quality.

SUMMARY

A laser-active solid body can be surrounded by a reflector for reflecting pumping light that exits through a lateral surface of the solid body, such that the pumping light re-enters the solid body in a diffusely distributed fashion.

In a first general aspect, an apparatus for optically pumping a laser-active solid body with pumping light coupled into the solid body through an end surface of the solid body is disclosed. The apparatus includes a laser-active solid body including an end surface though which pumping light is coupled into the solid body and a lateral surface through which pumping light exits the solid body, a reflector surrounding the laser-active solid body at a distance from the lateral surface of the solid body for reflecting light that exists the solid body back towards the solid body, and a surface for diffusing light that is coupled into the solid body through the end surface of the solid body and that exits the solid body through the lateral surface. The surface is selected from the group consisting of the lateral surface and a surface of the reflector.

Implementations can include one or more of the following features. For example, the surface for diffusing light can be the lateral surface. The reflector can have a surface that diffusely reflects the exiting pumping light or a mirror-like reflecting smooth surface for reflecting the exiting pumping light.

The surface for diffusing light can be the surface of the reflector. The lateral surface of the solid body also can have a surface that diffuses the exiting pumping light, or the lateral surface of the solid body can have a mirror-like smooth surface. The apparatus can further include a medium disposed on the outside of the lateral surface having a higher refractive index than the solid body. The medium can be disposed in the form a layer on the lateral surface. The reflector can have a surface that diffusely reflects exiting pumping light.

A cooling medium flows through a gap between the solid body and the reflector, and the cooling medium can be water.

At least 3% of the pumping light coupled into the solid body though the end surface can be diffusely distributed in the solid body. At least 20% of the pumping light coupled into the solid body though the front side can be diffusely distributed in the solid body. At least 40% of the pumping light coupled into the solid body though the front side can be diffusely distributed in the solid body.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
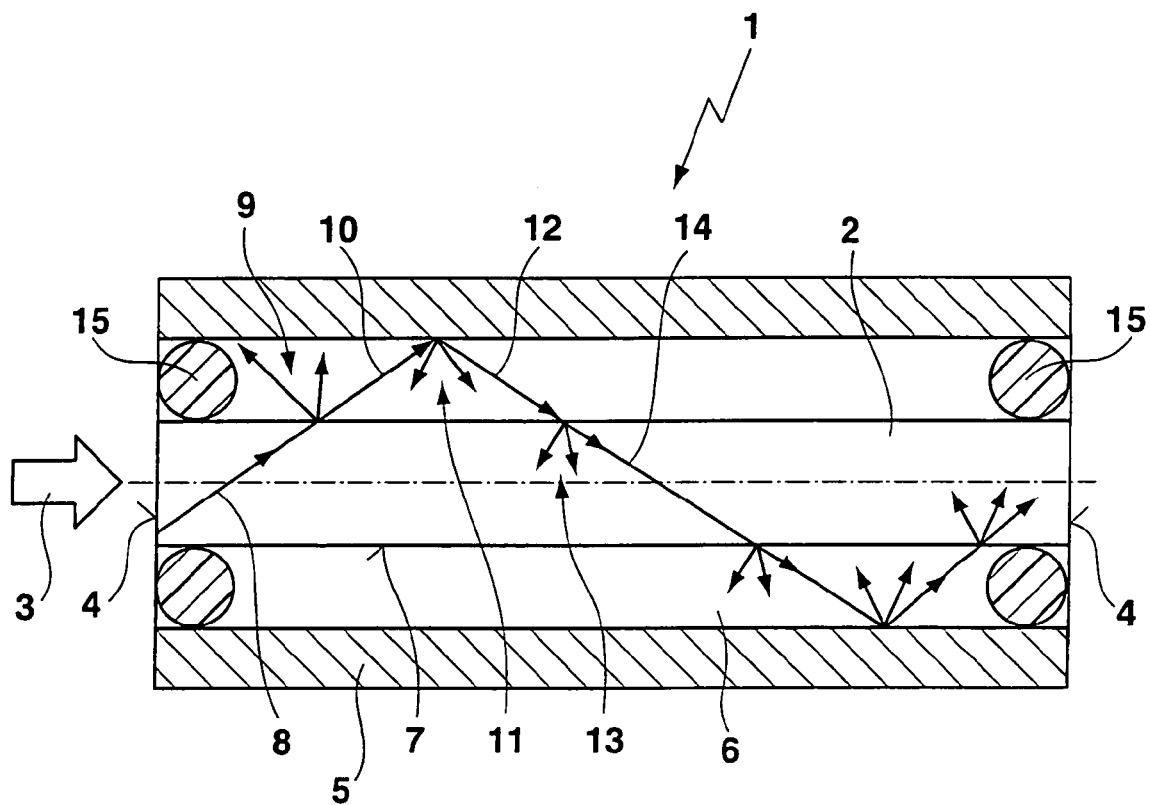
FIG. 1 is a cross-sectional view of an optical pumping device having a laser-active solid body with matted lateral surface and with a diffusely reflecting reflector.

The device 1 shown in FIG. 1 serves for optical pumping a rod-shaped, laser-active solid body 2, e.g., of a Nd:YAG crystal. Additionally, for example, laser crystals of quasi-homogeneous doped volume material, composite crystals with segments of different doping, gradient-doped crystals and gradient-doped sintered, polycrystalline laser ceramics may be used as laser-active solid bodies 2. Focused pumping light 3 of one or more laser diodes is coupled into the solid body 2 through one or both end surfaces 4. One end surface 4 can be designated as a front surface. The pumping light 3 is thereby preferably focused through the end surface(s) 4 into a non-doped end region of the solid body 2. The solid body 2 is surrounded by a diffusely reflecting reflector 5 thereby forming an annular space or annular gap 6 between the body 2 and the reflector 5. The lateral surface 7 of the solid body 2 is matted or roughened such that the coupled pumping light 3 is not totally reflected at the lateral surface 7, and light beams 8 of the coupled pumping light that impinge on the lateral surface 7 exit as diffuse light 9 into the annular gap 6. Lateral surface 7 has a surface quality that diffusely distributes penetrating pumping light 3 and reduces total internal reflection of the coupled pumping light 8 and spatially homogenizes the pumping light. The surface quality of the lateral surface 7 also effectively suppresses formation of amplified stimulated emission and parasitic modes. The lateral surface is, for example, partially or completely roughened (e.g., matted) or structured such that at least 3%, e.g., at least 20%, or at least 40%, of the pumping light, coupled at the front side, exits through the lateral surface to the outside.

The light beams 10 of the diffuse light 9 are reflected as diffuse light 11 at the reflector 5 back toward the lateral surface 7. The reflected light beams 12 of the diffuse light 11 each re-enter solid body 2 through the matted lateral surface 7 in the form of diffuse light 13. The beam guidance described is repeated for the light beams 14 of the coupled diffuse light 13 until they are largely absorbed in the solid body 2. The diffuse distribution of the pumping light in the solid body 2 provides homogeneous distribution of the pumping light in the solid body, and the pumping light power density reaches no local excesses, thereby reducing the thermal disturbance in the solid body 2.

The diffuse distribution of the reflected pumping light 13 and the resulting homogeneous illumination of the solid body 2 produce no local excess in the pumping light power density within solid body 2, thereby reducing the thermal disturbance in the solid body 2. This results in an optical resonator that is only slightly detuned and that becomes instable only with very high pumping power. Thus, high pumping power can be achieved, which increases the extraction of power from the laser-active solid body 2. A reduction of the length of the solid body, increased doping in the solid body, and improved laser beam quality with the same laser power can also achieved due to the homogenous illumination of the laser-active solid body 2.

The annular gap 6 is sealed at the ends from the outside by annular seals 15, and a cooling liquid (e.g., water) flows through the gap 6 to cool the solid body 2. The lateral surface 7 is polished at the ends cooperating with the annular seals 15 to improve the sealing effect.

Figure 2:
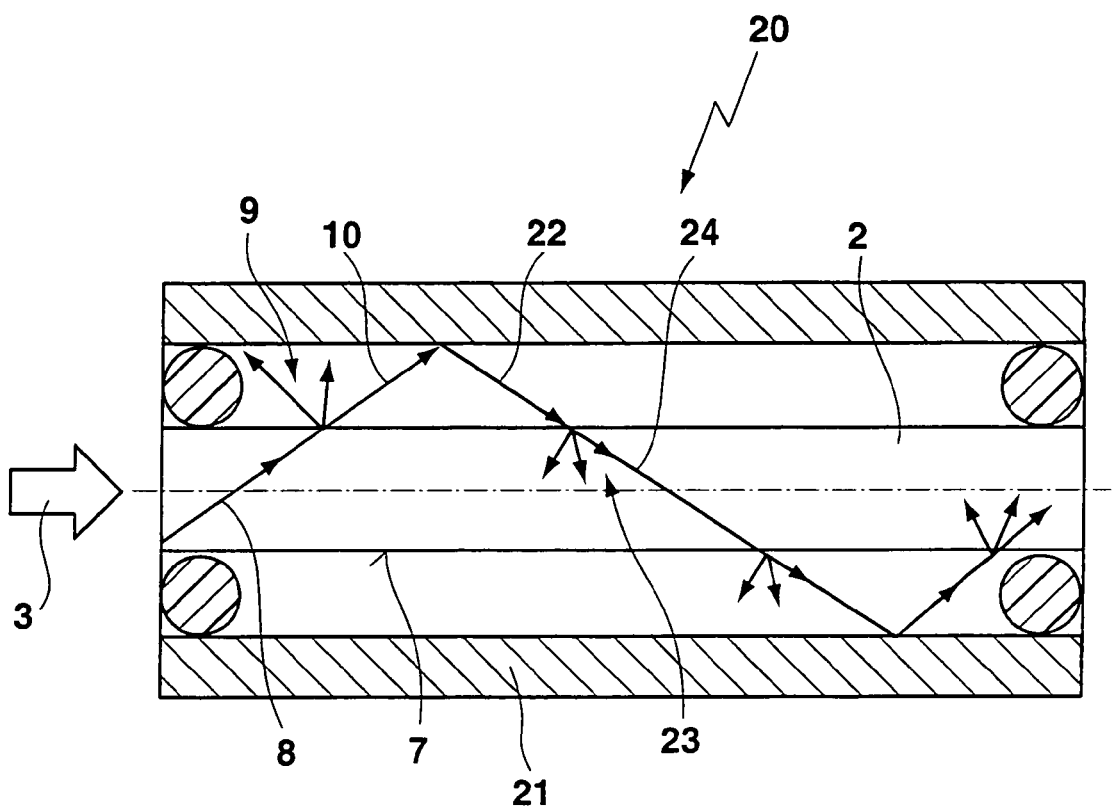
FIG. 2 is a cross-sectional view of an optical pumping device having a laser-active solid body with matted lateral surface and with a mirror-like reflector, as opposed to a diffusely reflecting reflector.

The optical pumping device 20 shown in FIG. 2 differs from the optical pumping device 1 by a reflector 21 that reflects impinging light like a mirror. The light beams 10 of the diffuse light 9 exiting the matted lateral surface 7 are each reflected as light beams 22 reflected at the reflector 21 and coupled as diffuse light 23 into the solid body 2 through the matted lateral surface 7. The described beam guidance is repeated for the light beams 24 of the coupled diffuse light 23 until they are largely absorbed in the solid body 2.

Figure 3:
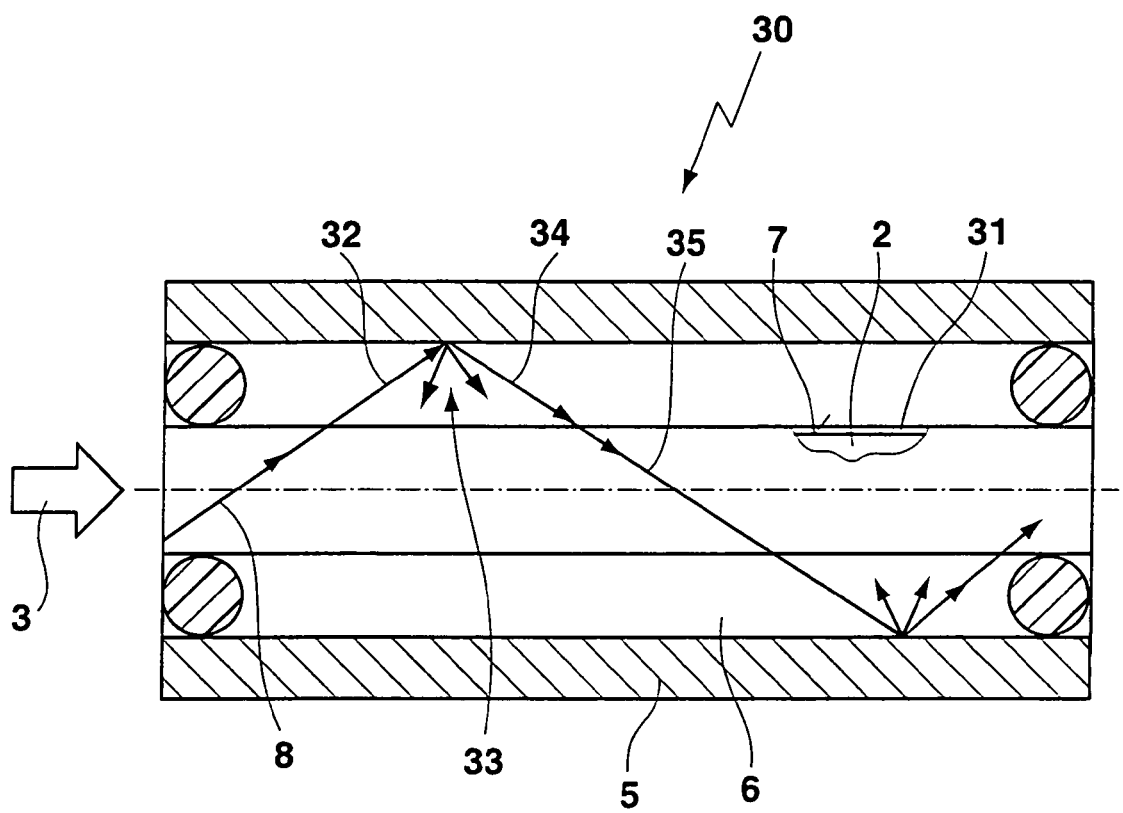
FIG. 3 is a cross-sectional view of an optical pumping device having a laser-active solid body with a polished lateral surface, a layer on the surface that has a higher refractive index than the solid body, and a diffusely reflecting reflector.

The pumping device 30 of FIG. 3 differs from the optical pumping device 1 in that a layer 31 on the outside of the totally reflecting polished lateral surface 7 of the solid body 2 has a higher refractive index than the solid body 2, which reduces the total internal reflection of light beams 8 within the solid body 2. Similarly, for example, the annular gap 6 between the lateral surface 7 and the reflector 5 can be filled with a medium having a higher index of refraction than the solid body 2. For this reason, light beams 8 of the coupled pumping light that impinge on the inner side of the lateral surface 7 exit through the polished lateral surface 7 and the layer 31 into the annular gap 6 as light beams 32 and are subsequently reflected at the diffusely reflecting reflector 5 in the form of diffuse light 33 back towards the lateral surface 7. The light beams 34 of the diffuse light 33 re-enter as light beams 35 the solid body 2 through the layer 31 and the lateral surface 7. The described beam guidance is repeated for the light beams 35 until they are largely absorbed in the solid body 2.

Figure 4:
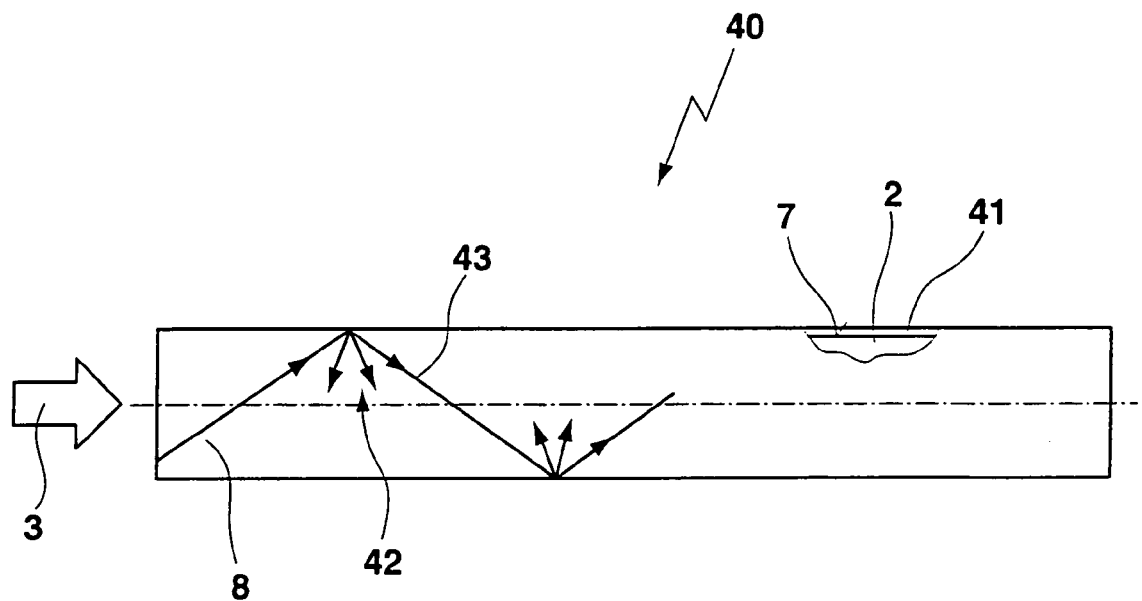
FIG. 4 is a cross-sectional view of an optical pumping device having a laser-active solid body with a matted lateral surface and a reflecting layer on the matted lateral surface.
Figure 5:
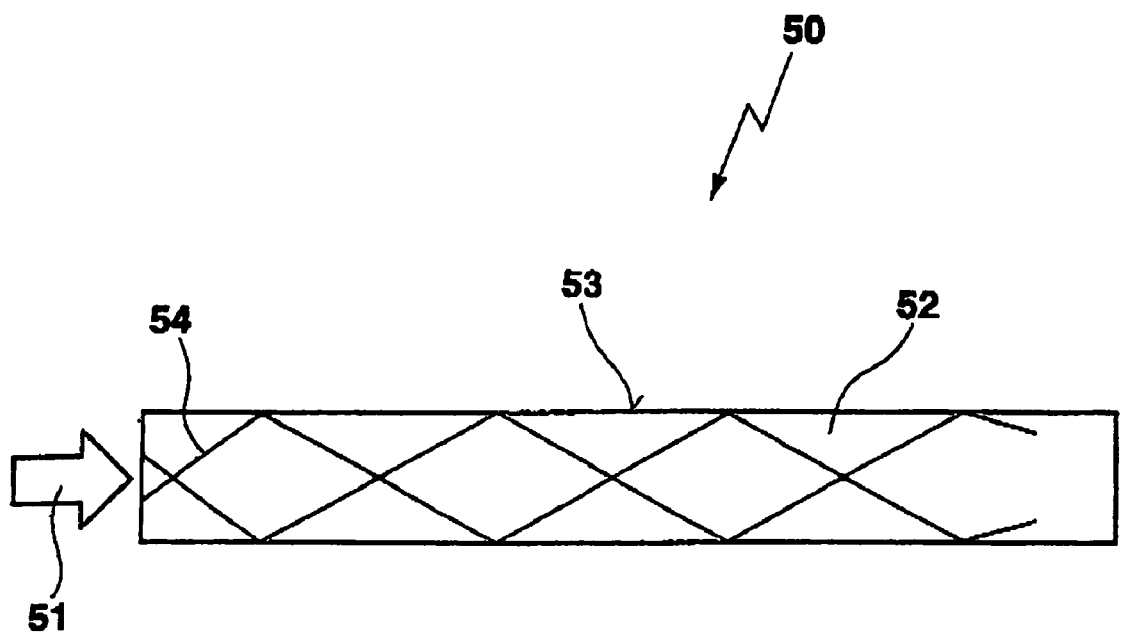
FIG. 5 is a cross-sectional view of an optical pumping device in which pumping light coupled into a solid body is totally internally reflected at a polished lateral surface of the solid body.

In the optical pumping device 40 shown in FIG. 4, the matted or roughened lateral surface 7 of the solid body 2 is provided with a reflecting layer 41. Light beams 8 of the coupled pumping light which impinge on the lateral surface 7 are diffusely distributed at the matted lateral surface 7 and reflected as diffuse light 42 by the reflecting layer 41 back to the solid body 2. The described beam guidance is repeated for the light beams 43 of the diffuse light 42 until they are largely absorbed in the solid body 2.

In the optical pumping arrangements described above, at least 3%, 20%, or 40%, of the front-side coupled pumping light 3 is diffusely distributed in the solid body 2. For example, at least 3%, 20%, or 40% of the light energy coupled into the front side 4 of the solid body can be absorbed in the solid body 2 after being diffused by one or more of the diffusing surfaces.

The optical pumping arrangements described above can be used for operating a laser oscillator and also as post-amplifying arrangement.

OTHER EMBODIMENTS

A number of embodiments of the invention have been described. Nevertheless, it will be understood that various modifications may be made. Accordingly, other embodiments are within the scope of the following claims.

What is claimed is:

1. An apparatus for optically pumping a laser-active solid body with pumping light coupled into the solid body through an end surface of the solid body, the apparatus comprising:
   a laser-active solid body including an end surface through which pumping light is coupled into the solid body and a lateral surface through which pumping light exits the solid body;
   a reflector surrounding the laser-active solid body at a distance from the lateral surface of the solid body for reflecting light that exits the solid body back towards the solid body, thereby forming an annular gap between the solid body and the reflector; and
   a surface for diffusively scattering and spatially homogenizing light that is coupled into the solid body through the end surface of the solid body and that exits the solid body through the lateral surface, wherein the surface is selected from the group consisting of the lateral surface and a surface of the reflector;
   wherein the surface for diffusing light is the lateral surface and the reflector has a surface that diffusely reflects the exiting pumping light.

2. The apparatus of claim 1, wherein the reflector has a smooth-mirror-like reflecting surface for reflecting the exiting pumping light.

3. The apparatus of claim 1, further comprising a medium disposed on the outside of the lateral surface having a higher refractive index than the solid body.

4. The apparatus of claim 3, wherein the medium is disposed in the form of a layer on the lateral surface.

5. The apparatus of claim 1, wherein a cooling medium flows through the gap between the solid body and the reflector.

6. The apparatus of claim 5, wherein the cooling medium is water.

7. The apparatus of claim 1, wherein at least 3% of the pumping light coupled into the solid body through the end surface is diffusely distributed in the solid body.

8. The apparatus of claim 1, wherein at least 20% of the pumping light coupled into the solid body through the front side is diffusely distributed in the solid body.

9. The apparatus of claim 1, wherein at least 40% of the pumping light coupled into the solid body through the front side is diffusely distributed in the solid body.

10. An apparatus for optically pumping a laser-active solid body with pumping light coupled into the solid body through only an end surface of the solid body, the apparatus comprising:
   a laser-active solid body including an end surface through which pumping light is coupled into the solid body and a lateral surface through which pumping light exits the solid body;
   a reflector surrounding the laser-active solid body at a distance from the lateral surface of the solid body for reflecting light that exits the solid body back towards the solid body, thereby forming an annular gap between the solid body and the reflector; and
   a surface for diffusively scattering and spatially homogenizing light that is coupled into the solid body through the end surface of the solid body and that exits the solid body through the lateral surface, wherein the surface is the surface of the reflector.

11. The apparatus of claim 10, wherein the lateral surface of the solid body also has a surface that diffuses the exiting pumping light.

12. The apparatus of claim 10, wherein the lateral surface of the solid body has a mirror-like smooth surface.

13. The apparatus of claim 10, wherein a cooling medium flows through the gap between the solid body and the reflector.

14. The apparatus of claim 10, wherein at least 3% of the pumping light coupled into the solid body through the end surface is diffusely distributed in the solid body.

15. The apparatus of claim 10, further comprising a medium disposed on the outside of the lateral surface having a higher refractive index than the solid body.

16. An apparatus for optically pumping a laser-active solid body with pumping light coupled into the solid body through only an end surface of the solid body, the apparatus comprising:
   a laser-active solid body including an end surface through which pumping light is coupled into the solid body and a lateral surface through which pumping light exits the solid body;
   a reflector surrounding the laser-active solid body at a distance from the lateral surface of the solid body for reflecting light that exits the solid body back towards the solid body, thereby forming an annular gap between the solid body and the reflector;
   a surface for diffusively scattering and spatially homogenizing light that is coupled into the solid body through the end surface of the solid body and that exits the solid body through the lateral surface, wherein the surface is selected from the group consisting of the lateral surface and a surface of the reflector; and
   a medium disposed on the outside of the lateral surface having a higher refractive index than the solid body;
   wherein the reflector has a surface that diffusely reflects exiting pumping light.

17. The apparatus of claim 16, wherein a cooling medium flows through the gap between the solid body and the reflector.

18. The apparatus of claim 16, wherein at least 3% of the pumping light coupled into the solid body through the end surface is diffusely distributed in the solid body.

19. The apparatus of claim 16, wherein the surface for diffusing light is the lateral surface.

20. The apparatus of claim 16, further comprising a medium disposed on the outside of the lateral surface having a higher refractive index than the solid body.

* * * * *

UNITED STATES PATENT AND TRADEMARK OFFICE
CERTIFICATE OF CORRECTION

PATENT NO. : 7,428,257 B2
APPLICATION NO. : 10/765051
DATED : September 23, 2008
INVENTOR(S) : Malte Kumkar et al.

It is certified that error appears in the above-identified patent and that said Letters Patent is hereby corrected as shown below:

On the Title page, item [73]:
Please change the Assignee name "TRUMPF Laser Marketing Systems AG" to
--TRUMPF Laser Marking Systems AG--

Signed and Sealed this

Twentieth Day of January, 2009

JON W. DUDAS
*Director of the United States Patent and Trademark Office*